E. F. THUM.
APPARATUS FOR REGULATING THE TEMPERATURE OF INCUBATORS.
APPLICATION FILED OCT. 8, 1913.
1,212,283.
Patented Jan. 16, 1917.
3 SHEETS—SHEET 1.
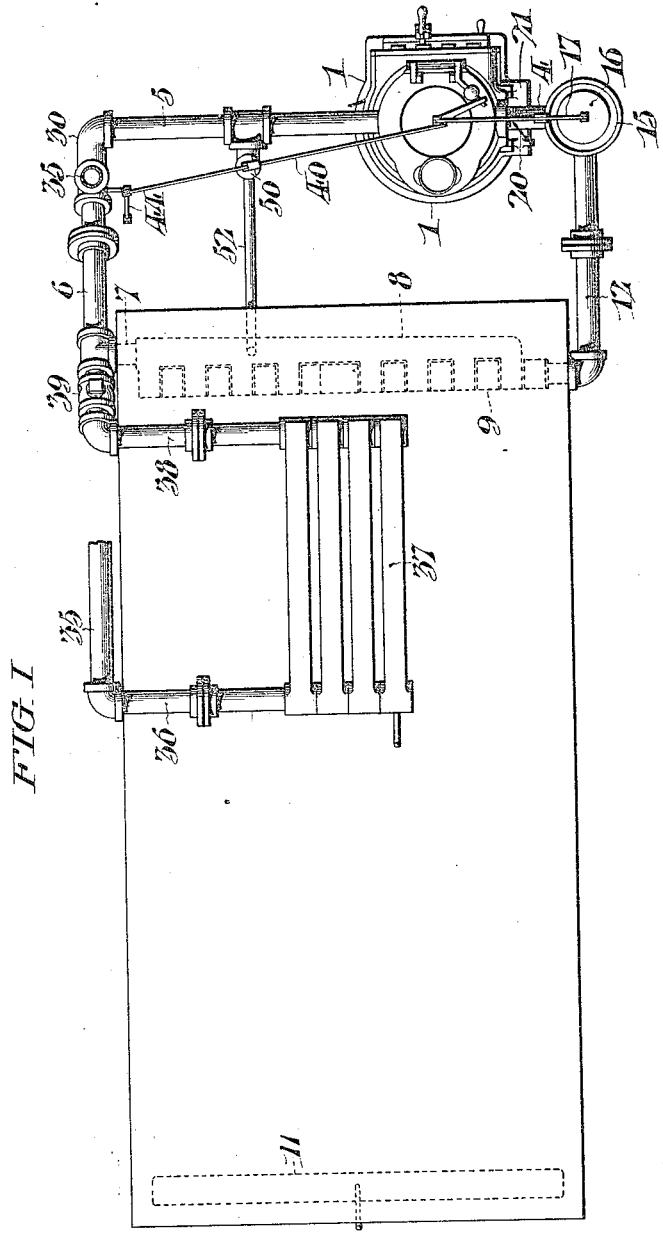
FIG. I
Inventor
Ellwood F. Thum,
by Mercy + Paul
Attorneys
Witnesses
John C. Bergner
James H. Bell

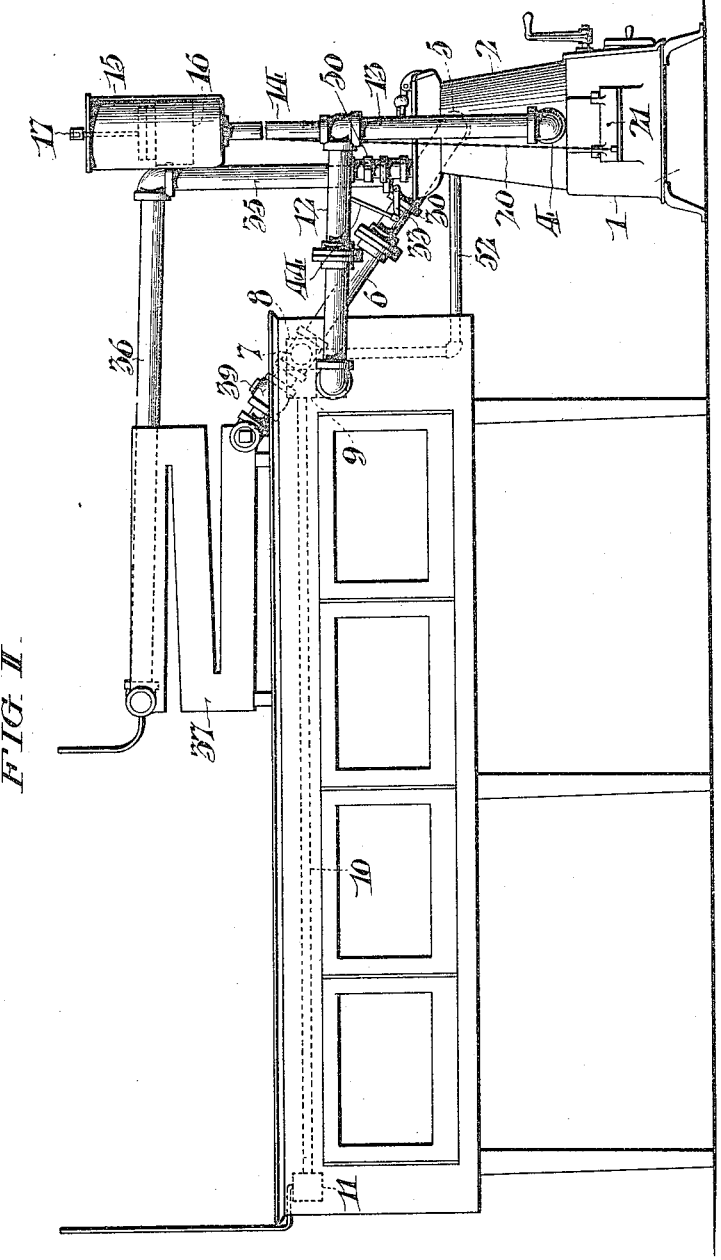

E. F. THUM.
APPARATUS FOR REGULATING THE TEMPERATURE OF INCUBATORS.
APPLICATION FILED OCT. 8, 1913.
1,212,283.
Patented Jan. 16, 1917.
3 SHEETS—SHEET 3.
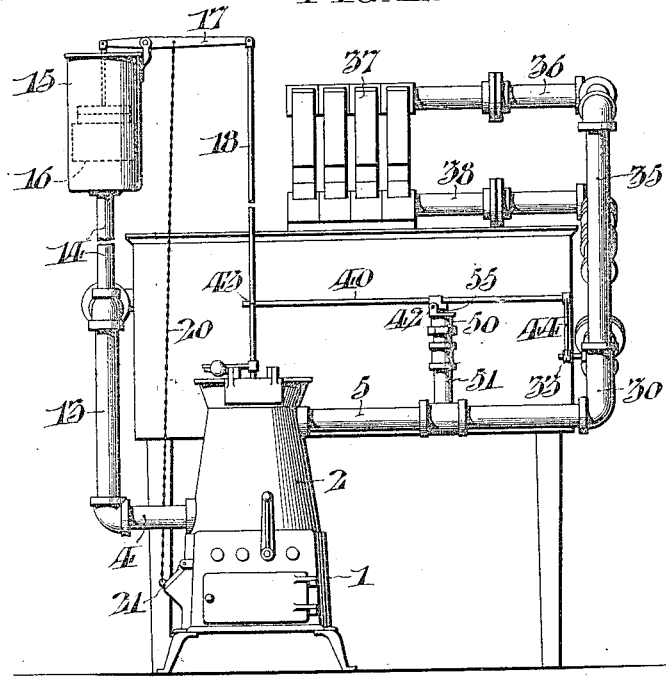
FIG. III.
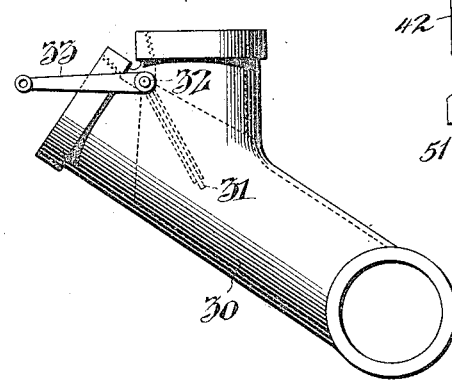
FIG. IV.
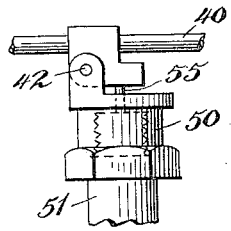
FIG. V.
Inventor
Ellwood F. Thum,
Witnesses

UNITED STATES PATENT OFFICE.

ELLWOOD F. THUM, OF PHILADELPHIA, PENNSYLVANIA, ASSIGNOR TO HAROLD L. WATSON, OF NEWTOWN, PENNSYLVANIA.

APPARATUS FOR REGULATING THE TEMPERATURE OF INCUBATORS.

1,212,283.     Specification of Letters Patent.     Patented Jan. 16, 1917.

Application filed October 8, 1913. Serial No. 794,011.

*To all whom it may concern:*

Be it known that I, ELLWOOD F. THUM, residing at Philadelphia, in the county of Philadelphia and State of Pennsylvania, have invented certain new and useful Improvements in Apparatus for Regulating the Temperature of Incubators, whereof the following is a specification, reference being had to the accompanying drawings.

My device relates to a system by which incubators are heated by the circulation of hot water, and consists in a device for automatically regulating the temperature. This I accomplish by the employment of a device (as for example a radiator), which permits the hot water to radiate some of its heat exterior to the incubator, and connections whereby the heated water may (or may not) be compelled to pass through such device (with accompanying loss of heat), before passing into the hot water pipes within the incubator. An automatic regulating device is provided whereby whenever the temperature of the water exceeds a certain limit, the hot water is thus deflected preliminarily to the radiator with a corresponding lowering of the temperature. When the temperature has been lowered to a certain limit the automatic regulator causes the hot water to again pass directly to the incubator until the temperature rises again.

I have illustrated my invention as used in conjunction with another system of regulation for the fire of a hot water heater because it is convenient to use my system as supplemental to an automatic regulator of the fire, but it will be understood that its scope is not thus limited and that it may be used independently of any other system of regulation.

I have also illustrated as alternatives two automatic means for deflecting the hot water circulation, either of which may be successfully used; but it will be understood that my invention is not dependent upon the use of any particular means for effecting automatically this deflection, but comprehends the use of any automatic regulator whereby the circulation may be alternatively deflected either to a radiator before entering the incubator, or caused to pass directly to the incubator.

In the accompanying drawings, Figure I, is a plan view of a heating apparatus for an incubator embodying my invention. Fig. II, is a side elevation of the same. Fig. III, is an end elevation of the same. Fig. IV, is a detail of the valve employed for effecting the alternative deflection of the circulation. Fig. V, shows an automatic regulator adapted for use in my invention.

As shown in the drawings, a hot water heater 1, is provided with a water jacket 2, which is connected to the water system of the incubator by means of an ingress pipe 4, and an egress pipe 5. The egress pipe 5, leads by way of connecting members 6, and 7, to the front manifold 8, situated within the incubator. This manifold is in juxtaposition to another manifold 9, and both are connected by alternating pipes 10, (Fig. II), with a rear manifold or header 11, so that the hot water after passing from the front to the rear manifolds a number of times is ultimately led from the heating pipes by the pipes 12, and 13, to the ingress pipe 4.

The heating system for incubators which I have thus briefly described, was not invented by me, and is not herein claimed. A regulating device for this hot water system acting directly upon the fire, is also shown in the drawings, and although not invented by me may be thus described since I have shown my invention as it may be employed to supplement such direct automatic regulation of the fire.

The pipe 13, is prolonged upwardly in the form of a stand pipe 14, terminating in an open receptacle 15, containing a float 16, which is connected by the horizontal lever 17, to a rod 18, at the lower end of which is a valve (not shown), operating directly upon the main draft of the heater above the combustion chamber. Similarly a chain 20, connects the lever 17, with a door 21, which constitutes the opening for the draft below the combustion chamber of the heating furnace. By these connections the draft of the furnace is directly controlled by the expansion or contraction of the body of water in circulation. When this body of water becomes heated above the proper limit, it expands, raising the float so as to close the draft of the furnace simultaneously both above and below the combustion chamber, thus shutting off air from the fire and checking combustion. On the other hand, as the temperature of the hot water falls with corresponding contraction of the volume of water in circulation, the float falls and the draft valves are opened again.

I will now describe the system of regulation of the temperature of the incubator which I have invented. It operates upon the water circulation. It is more delicate and more rapid in its operation than systems which operate by the control of the combustion of the furnace.

The pipe 6, by which the heated water is led from the hot water jacket to the incubator is provided with a Y, 30, (see Fig. IV), this Y is fitted interiorly with a butterfly valve 31, swinging on a pivot 32, at the crotch of the Y, whereby the circulation passing into the trunk of the Y, may be deflected alternately into either one of its branches by the movement of the arm 33, fast on the pivot of the valve.

If the circulation passes through the lower branch of the Y, it continues through the pipe 6, and passes directly into the incubator system, but if it is deflected to the upper branch of the Y, it passes to an upright pipe 35, thence to a horizontal pipe 36, which leads to a radiator 37, which may be conveniently mounted above the incubator, but which must be exterior thereto, and exposed to the cooling influence of radiation to the surrounding atmosphere. From this radiator the circulation passes to a pipe 38, and thence with interposition of a check valve 39, to the pipe 7, connecting with the manifold 8, within the incubator.

By the connections thus described it will be seen that when the valve 31, is in its uppermost position as seen in Fig. IV, closing the upper branch of the Y, the circulation passes directly to the incubator its further travel to the radiator being prevented by the check valve 30; but when the valve is in its other position, the hot water circulation is deflected toward the radiator through which it must pass before entering the incubator, whereby it suffers a corresponding loss of temperature. The extent of this diminution of temperature depends upon the size of radiator employed, but in any event it is sufficiently great to quickly cause an immediate fall of the temperature within the incubator.

I have shown and will describe two means for automatically controlling the valve 31, whereby this regulation of the temperature may be secured.

According to the first of these two methods the arm 33, is attached to a link 44, which is pivoted to a transverse lever 40, fulcrumed at 42, and connected at 43, to the rod 18. By this connection the expansion or contraction of the water in the system operating upon the float as has been described effects the movement of the valve to accomplish deflection of the water circulation to the radiator whenever the temperature of the water rises above a certain limit.

The other and alternative system of automatic regulation, which I have shown, comprises what is known as a "sylphon regulator" 50, attached to the upper end of an upright pipe 51, which is connected to the egress pipe 5. To insure the constant passage of some heated water from the water jacket through this sylphon regulator, a small by-pass 52, is provided leading such water directly to the forward manifold 8. This circulation passes around a closed expansible metal chamber within the sylphon regulator containing a body of thermo-sensitive liquid. When heated by the hot water, the liquid expands, thus expanding the chamber, and forcing upward a plunger 55.

In order to employ this system of regulation, the lever 40, is disconnected at 43, from the rod 18, leaving it free to move upon its fulcrum subject only to the movement of the plunger 55, controlled by the sylphon regulator, which as it advances or retracts affects the connections which have been described and moves the valve 31, within the Y of the pipe 6, so as to deflect the main circulation through the radiator whenever the temperature rises while permitting it to pass directly to the incubator as the temperature falls.

It will be understood that in principle my invention resides in the employment of the double path for the heated water with the deflecting valve, whereby the circulation may or may not be compelled to take a course in which it suffers lowering of temperature before entering the incubator, according as the temperature of the water rises or falls. The character of the valve or valves employed to effect this deflection of the circulation may vary. The means for lowering the temperature of the water may vary, and the automatic control of the valve may vary, since my invention resides broadly in the scheme of accurately controlling the temperature of the water in the incubator by cooling means applied to the water before it reaches the incubator, whenever the temperature of the water is otherwise too high.

Having thus described my invention, I claim:

1. In a heating system for incubators, the combination of an incubator and a hot water heater; alternative pipes leading from the heater to the incubator; means connected with one of these pipes for cooling the water therein, a valve controlling the course of the water between these alternative pipes; a single thermostatic means for controlling said valve and also the draft of the heater, said means being actuated by the temperature of the water.

2. In a heating system for incubators, the combination of an incubator; a water system comprising heating pipes in said incubator, a hot water heater provided with a water jacket, ingress and egress pipes connecting the heating pipes with said water jacket; an alternative pipe connecting the egress pipe with said heating pipes; a cooling device interposed in said alternative pipe; a valve situated at the point where said alternative pipe meets the egress, whereby all or any part of the water circulating from the water jacket may be deflected through said cooling device, and a single thermostatic means actuated by the temperature of the water for controlling said valve and the draft of the heater.

3. In a heating system for incubators, the combination of an incubator; a water system comprising heating pipes in said incubator, a hot water heater provided with a water jacket, ingress and egress pipes connecting the heating pipes with said water jacket, an alternative pipe connecting the egress pipe with said heating pipes; a cooling device interposed in said alternative pipe; a valve situated at the point where said alternative pipe meets the egress pipe, whereby all or any part of the circulation from the water jacket may be deflected through said cooling device; a float in an open receptacle connected by a stand pipe to the water system, and rising or falling with the expansion or contraction of the water due to its temperature; and mechanical connections whereby said float controls both the valve and the draft of the heater.

In testimony whereof, I have hereunto signed my name at Philadelphia, Pennsylvania, this third day of October, 1913.

ELLWOOD F. THUM.

Witnesses:
JAMES H. BELL,
E. L. FULLERTON.

Copies of this patent may be obtained for five cents each, by addressing the "Commissioner of Patents, Washington, D. C."